INVENTORS
DAVID E. FORD, JR
WILLIAM J. HUDSON

BY

ATTORNEY

United States Patent Office 3,518,518
Patented June 30, 1970

3,518,518
AUTOMATIC FIELD REGULATION FOR A SHUNT FIELD MOTOR FOR REGENERATIVE BRAKING
David E. Ford, Jr., and William J. Hudson, Milwaukee, Wis., assignors to Allen-Bradley Company, Milwaukee, Wis., a corporation of Wisconsin
Continuation-in-part of application Ser. No. 404,350, Oct. 16, 1964. This appplication July 26, 1967, Ser. No. 656,302
Int. Cl. H02p 5/06
U.S. Cl. 318—308                                              4 Claims

ABSTRACT OF THE DISCLOSURE

Four embodiments disclose a shunt field motor with a D-C transformer in the armature circuit and another D-C transformer in the field circuit providing feedback signals proportional to load and to field flux. A detector compares the feedback signals and transmits an error signal to control field excitation. The first embodiment employs the conductance of a back-biased diode to tie the flux feedback to the armature feedback to limit field strengthening; and the third and fourth embodiments employ a Zener diode to limit field strengthening. The second embodiment discloses at controllable excitation source.

CROSS-REFERENCE TO RELATED APPLICATIONS

This is a continuation-in-part application of the copending application entitled, "Field Control for Direct Current Motor," Ser. No. 404,350, filed on Oct. 16, 1964.

BACKGROUND OF THE INVENTION

The present invention provides a new and vastly superior control for a long established conventional mode of operating direct current motors, particularly shunt field motors. By convention of long standing, a motor with a shunt field is said to operate at base speed under conditions of rated, or maximum continuous armature current and field current. Conventionally motor speed is reduced below base speed by decreasing the armature current and it is increased above base speed by decreasing the field current. The latter phenomenon occurs by virtue of the increased torque following upon the increased armature current occuring as a result of the decreased field flux due to the decrease in counter E.M.F. caused thereby. The same situation of course does not obtain when a motor is stalled under load, for then the weakened field serves to decrease the torque, and the field must be strengthened in order to produce sufficient torque to overcome the load and accelerate the motor back up to base speed.

For many years the prior art has strengthened or weakened the field by switching resistances in and out of the field circuit as the case required. Such an expedient involves, of course, the usual problems of mechanical contacts including the generation of large transients, arcing problems and the like, as well as large, abrupt changes in field current causing similar abrupt changes in torque and speed. Since the changes in field current were stepped or incremental the prior art devices could at best achieve a remote approximation to optimum field strength.

The present invention provides a fully automatic control whereby a stepless transition is made from any mode of operation to maximum field strength and back to the preselected mode of operation smoothly, continuously and without interruption, and throughout the transition the optimum proportion is maintained between the field flux and armature current so as to achieve maximum torque. This is achieved by structure which permits continuous comparison of the load condition with the field flux so that when an overload occurs while the field is weak, the field will be automatically strengthened to accelerate the motor back to base speed. As the motor approaches the desired speed, the field is automatically gradually weakened, maintaining the ideal proportion between load and flux for any given speed until the desired mode of operation is restored. The variations in field strength are not incremental as in the prior art but are stepless. The detection of a false condition, of the restoration of the desired mode of operation and of any condition between the two is automatic, as is the proportional variation in field strength commensurate with each condition.

SUMMARY OF THE INVENTION

The present invention relates to apparatus for automatic field regulation for a direct current shunt field motor including a controllable field excitation source, a load detector for generating a feedback signal proportional to a load on said motor, a flux detector for generating a feedback signal proportional to field flux in said motor, and an error detector connected to receive and compare said feedback signals and adapted to cause said field excitation source to vary the strength of said field in said motor when said feedback signals indicate a deviation from a preset mode of operation.

It is an object of the present invention to provide a field control which will automatically strengthen the field during overload conditions and restore the field to its normal condition after the motor has been reaccelerated.

It is another object of the present invention to provide a field control for direct current motor which will automatically maintain optimum field strength for any condition of the motor.

It is another object of the present invention to provide a continuous feedback field regulation for a shunt field direct current motor which will steplessly and proportionally vary the field strength of the motor to achieve optimum flux for any motor condition between stall and a preset mode of operation.

It is another object of the present invention to provide a field control for direct current motor operating in a weak field condition which control will automatically restore the field to rated strength in an overload condition and return it to the desired mode of operation when the motor has been accelerated back up to the desired speed.

It is another object of the present invention to provide a field control for direct current motor which does not require the insertion or removal of resistances in the field circuit of the motor.

It is another object of the present invention to provide a field control for a direct current motor which operates without utilizing mechanical switches.

The foregoing and other objects and advantages will appear from the following description of the embodiment of the invention shown in the accompanying drawings which form a part of this disclosure. These embodiments are described in sufficient detail to enable those skilled in the art to practice this invention, but structural changes may be made in the embodiments described and other embodiments may be used in practicing the present invention. Hence, the following detailed description is not to be considered definitive of the scope of this invention, which instead is particularly pointed out and distinctly claimed in the claims to be found at the conclusion of this specification.

DESCRIPTION OF THE PREFERRED EMBODIMENTS

Figure 1:
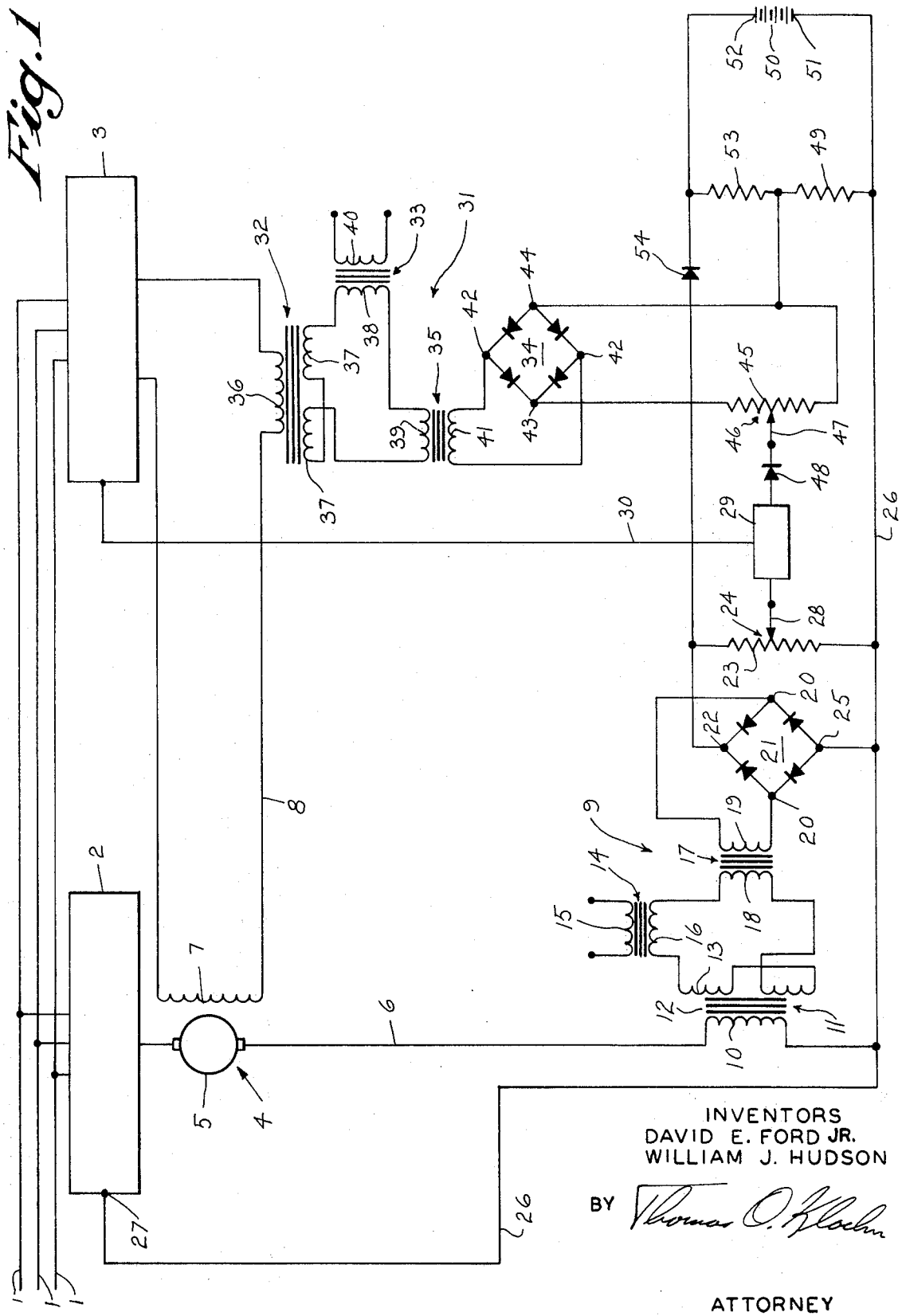
FIG. 1 is a schematic diagram of one embodiment of the present invention.

In the drawings no attempt is made to show a complete motor control. All that is shown in the drawings is the structure of the immediate invention and such environmental elements as may be necessary or helpful to the understanding of this invention. As a result, numerous components of a complete motor control are omitted entirely, even though they may be essential to the operation of a direct current motor, since they have no direct bearing on the present invention. However, one skilled in the art will be well aware of the omission and the need for such components, as well as the manifold components known to the art and available on the market to perform the necessary functions.

In FIG. 1 three phase alternating current power lines 1 conduct energy to an armature power supply 2 and a field excitation source 3 connected in parallel. The armature power supply 2 and the field excitation source 3 provide direct current to drive a direct current motor 4. The armature power supply 2 is connected across an armature 5 of the motor 4 by means of an armature circuit 6 and the field excitation source 3 is connected across the field winding 7 of the motor 4 through a field circuit 8. The armature power supply 2 and the field excitation source 3 may be any of a large variety of power converters, and as is obvious to anyone skilled in the art an appropriate direct current generator or battery not relying upon any alternating current source, if such were available, might also be used. It is essential for the purposes of this discussion that the output of the field excitation source 3 be variable and controllable.

Figure 2:
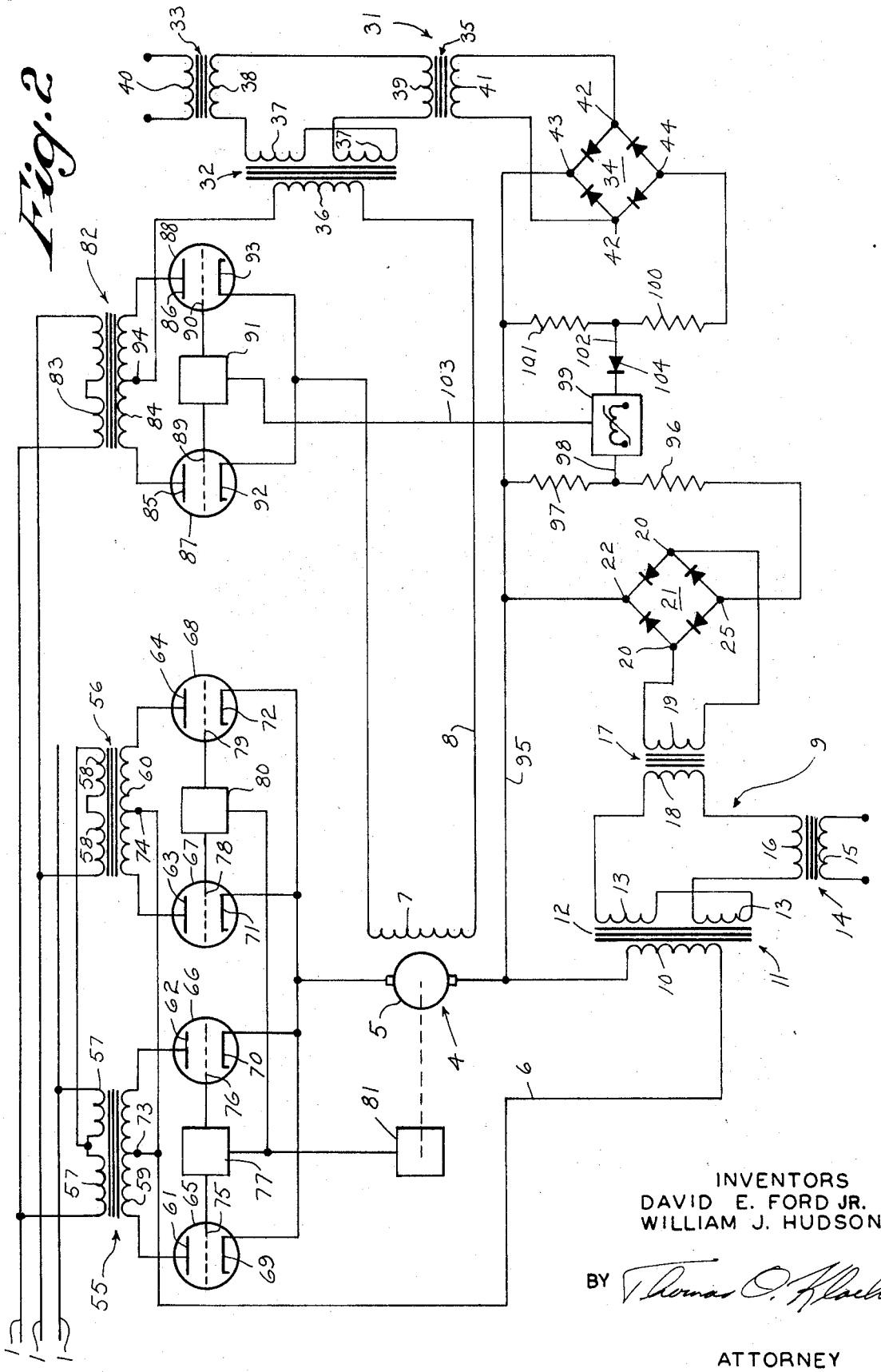
FIG. 2 is a schematic diagram of a second embodiment of the present invention.

A load detector for continuously detecting the magnitude of the load on the motor 4 and generating a feedback signal proportional to the load is connected to the armature 5, and in both embodiments shown in FIGS. 1 and 2 it is comprised of the same components. An armature current sensing device in the form of a direct current transformer 9 senses the magnitude of armature current flow through its control winding 10 which is connected in the armature circuit 6 in series with the armature 5. The control winding 10 governs the conductivity of a saturable reactor 11 which has a saturable core 12 and a pair of oppositely polarized main windings 13. An alternating current source in the form of a transformer 14, which has its primary 15 connected to an alternating current line (not show) and its secondary 16 connected in series with the main windings 13 of the saturable reactor 11, provides the power for the direct current transformer 9. An output transformer 17 has its primary winding 18 connected in series with the main windings 13 of the saturable reactor 11 and the secondary winding 16 of the input transformer 14, and its secondary winding 19 is connected across the input terminals 20 of a bridge rectifier 21.

A positive output terminal 22 of the load detector bridge rectifier 21 is connected to one end of a resistance element 23 of an armature current feedback potentiometer 24 is connected to an overload detector 29. A base line 26 provides a common connection for the negative pole 27 of the armature power supply 2, the negative terminal 25 of the rectifier 21, the opposite end of tthe resistance element 23 of the armature current feedback potentiometer 24, and the corresponding components of a flux detector described below.

The error detector 29 may be any form of a comparison circuit capable of comparing two input signals and producing an error signal proportional to the difference between them. Numerous devices of this sort may be found on the market and in common use. The error detector 29 has its output 30 connected to the field excitation source 3 so that the error signal produced in the error detector 29 may be used to control the output of the field current from the field excitation source 3.

A flux detector to measure the flux generated by the field winding 7 and to generate a proportional feedback signal is provided in the form of a field current sensing device which continuously samples the flow of field current to produce a feedback signal proportional to the field current. The field current sensing device like the armature current sensing device is a direct current transformer 31 composed of a saturable reactor 32, an alternating current source in the form of the input transformer 33 and a bridge rectifier 34, which is connected to the other two components through an output transformer 35. The saturable reactor 32 has it control winding 36 connected in the field circuit 8 in series with the field winding 7, and its main windings 37 are connected in series with a secondary winding 38 of the input transformer 33 and a primary winding 39 of the output transformer 35. The primary winding of the input transformer 33 is connected across an alternating current line (not shown) and a secondary winding 41 of the output transformer 35 is connected across input terminals 42 of the bridge rectifier 34. The positive and negative output terminals 43 and 44 of the flux detector rectifier 34 are connected across a resistance element 45 of a field current feedback potentiometer 46, which has its sliding contact 47 connected through a diode 48, from cathode to anode, to the error detector 29. The negative output terminal 44 of the bridge rectifier 34 is also connected through a drop resistor 49 to the common base line 26.

A field current limiting means, represented in the form of a battery 50, has its negative terminal 51 connected to the common base line 26 and its positive terminal 52 connected to one end of a divider network comprised of a pair of drop resistors 53 and 49. The positive terminal 52 of the field current limiting D-C source 50 is also connected through a unidirectional current gate in the form of a diode 54, which is oriented to block the flow of current from the D-C source 50 to the upper end of the armature current feedback potentiometer 24 and the positive terminal 22 of the load detector rectifier 21. The divider network, consisting of the drop resistors 53 and 49, and the limiting source 50 serve to determine at what level a fault condition exists in the loading of the motor 4 so as to require field strengthening and to prevent further strengthening of the field after full field strength has been reached. By varying the values of the drop resistors 49 and 53 and the output of the limiting source 50, the embodiment shown may be suited to the rated value of any particular field winding and to any particular mode of operation of a direct current motor.

When the direct current motor 4 is operating at the predetermined mode of normal operation, unidirectional current flows from the armature power supply 2 through the armature circuit 6 to the armature 5, the control winding 10 and back to the negative terminal 27 of the armature supply 2, and field current flows from the field excitation source 3 through the field winding 7 and the control winding 36 in the field circuit 8. The motor 4 may be considered as operating, according to the preset mode of operation, in excess of its base speed with a weak field, or, in other words, under field control. When an overload condition develops, causing for example a stall, motor speed is drastically diminished, and perhaps stopped. When the armature 5 is slowed, the back E.M.F. generated in the armature 5 is reduced, permitting heavier flow of armature current. As the current flow in the armature circuit 7 increases, it also increases in the control winding 10 of the saturable reactor 11, tending to drive the saturable core 12 towards saturation, and thus reducing the impedance to the flow of current in the main windings 13. Hence, a greater current flows from the input transformer 14 through the main windings 13 and the primary winding 18 of the output transformer 17, so as to impose a larger alternating current signal across the input terminals 20 of the bridge rectifier 21. As a result, the potential across the output terminals 22 and 25 of the rectifier 21 and therefore across the resistance element 23 of the armature current feedback potentiometer 24 is increased, and the increase is proportional to the increase in armature current flowing in the armature circuit 8.

As the potential level of the sliding contact 28 on the armature current feedback potentiometer 24, which constitutes the output of the load detector, increases, current tends to flow from the sliding contact 28 through the error detector 29, and the blocking diode 48 to the sliding contact 47 on the field current feedback potentiometer 46, which constitutes the output of the flux detector. This current will then flow through the resistance element 45 of the armature current feedback potentiometer 46 and the drop resistor 49, and back through the common base line 26 to the negative terminal 25 of the rectifier 21 in the motor load detector. This flow of armature current feedback signal through the error detector 29 causes the error detector 29 to emit an error signal through its output 30 to the field excitation source 3. This error signal will cause the field excitation source 3 to strengthen the current in the field circuit 8 and hence in the field winding 7.

By the same mechanism described in connection with the direct current transformer 9 of the load detector, the increased field current is reflected in an increased potential of the sliding contact 47 of the field current feedback potentiometer 46. As the field current increases in the field circuit 8, the saturable reactor 32 is driven more towards saturation permitting a greater current flow through the main windings 37 from the input transformer 33. As a result, a larger signal is imposed across the bridge rectifier 34, and hence across the resistance element 45 of the field current feedback potentiometer 46, raising the potential of the sliding contact 47 with respect to the common base line 26. Assuming that the potential of the sliding contact 28 on the armature current feedback potentiometer 24 remains at the same level, the increased potential level of the sliding contact 47 on the field current feedback potentiometer 46 will tend to decrease the error signal from the error detector 29 to the field excitation source 3, bringing about a proportional adjustment of the field current relative to the armature current so as to achieve maximum torque for any given overload condition.

From the foregoing it may be seen how the values of the drop resistor 49 between the negative output terminal 44 of the flux detector and the base line 26 can determine when a fault condition occurs requiring field strengthening. The drop resistor 49 provides a fixed minimum potential for the sliding contact 47 on the field current feedback potentiometer 46, and the potential level of the sliding contact 28 on the armature current feedback potentiometer 24 must be increased by an amount sufficient to overcome the potential level of the sliding contact 47 on the field current feedback potentiometer 46 before field strengthening occurs. By increasing the value of the fault-level drop resistor 49 the armature speed at which field strengthening occurs is reduced, and conversely by decreasing the value of the fault-level drop resistor 49 the armature speed at which field strengthening occurs is raised.

The field current limiting function of the limiting battery 50 and the limiting drop resistor 53 in the divider network depends initially upon the comparative voltage level of the positive terminal 52 of the limiting battery 50 and the positive output terminal 22 of the bridge rectifier 21 in the load detector. During normal operation, the potential level of the positive terminal 52 of the limiting battery 50 is at a higher level than the positive terminal 22 of the bridge rectifier 21 so that the diode 54 is back biased to block the flow of current from the bridge rectifier 21. Hence, the output of the bridge rectifier 21 normally flows from the positive terminal 22 through the resistance element 23 of the armature current feedback potentiometer 24 and back to the negative output terminal 25 through the common base conductor 26. When the flow of current of the bridge rectifier 21 increases to the point that the potential level of the sliding contact 28 on the armature current feedback potentiometer is raised above the level of the sliding contact 47 on the field current feedback potentiometer 46, a portion of the current from the load detector rectifier 21 will flow through the error detector 29 and the lower half of the resistance element 45 in the field current feedback potentiometer 45 and the fault-level drop resistor 49, and back through the common base conductor 26 to the negative terminal 25 of the load detector rectifier 21. However, when the armature current becomes sufficiently high, for example as in a stall condition, to increase the potential level of the positive terminal 22 of the load detector rectifier 21 above that of the positive terminal 52 of the limiting battery 50, the diode 54 will be forward biased and a portion of the output from the load detector rectifier 21 will flow through the diode 54 and the resistor network back to the common base line 26. When this occurs, the relative potential levels of the sliding contact 28 on the armature current feedback potentiometer 24 and the sliding contact 47 on the field current feedback potentiometer 46 may be said to be clamped at a maximum determined by the limiting resistor 53 such that a further increase in the output of the load detector rectifier 21 cannot increase the difference between the two sliding contacts 28 and 47. Hence, the error signal from the error detector 29 cannot be increased further and the field current excitation source 3 cannot be stimulated to further strengthen the field. This results from the fact that every increase in the output of the load detector rectifier 21 will increase the potential levels of both sliding contacts 28 and 47 equally due to the portion of that output flowing through the limiting drop resistor 53 in parallel with the field current feedback potentiometer 46. But by varying the output of the clamping source 50 so as to increase or decrease the potential level of its positive terminal 52 varying the value of the limiting resistor 53 the level at which full field strengthening occurs may be varied to accommodate the field rating and desired mode of operation of the particular motor with which the invention is used. Similarly, by adjustments in sliding contacts 28 and 47 as well as in the value of the fault level drop resistor 49 the point at which field strengthening begins may be varied to suit any desired mode of operation of the motor 4.

It can be seen from the foregoing description that whenever the load on the motor 4 reduces the speed of motor 4 so that the resulting increase in armature current raises the potential level of the sliding contact 28 on the armature feedback potentiometer 24 above that of the sliding contact 47 and the field current feedback potentiometer 46, field strengthening will occur. As the field current increases through the field circuit 7 and the field winding 6, this increase is fed back through the field current feedback potentiometer 46 to raise the level of the sliding contact 47. This maintains the proper proportion between load and field flux so as to achieve the optimum motor torque. As the motor speed is reduced, the armature current increases at a much faster rate than the comparatively weak field current so that where a stall or some other preset condition occurs full field can be achieved. As the motor accelerates and approaches the desired speed the armature current will decrease due to the generation of back E.M.F., causing a proportional lowering of the potential level of the sliding contact 28 on the armature current feedback potentiometer 24, which reduces the error signal from the error detector 29. The reduction of the error signal causes a reduction in field current output which is fed back to the control and manifested in a reduced level of the sliding contact 47 on the field current feedback potentiometer 46. Hence, when full field strength no longer produces the optimum torque for the condition of the motor, the field will be automatically weakened. The adjustment of field strength to the motor load is automatic, immediate, stepless, and continuous so long as the motor condition is such as to maintain the armature current level such that the potential level of the sliding contact 28 on the armature current feedback potentiometer 24 is higher than the potential level of the sliding contact 47 on the field current feedback potentiometer 46. By the time the motor has been accelerated back to the desired mode of operation, the potential level of the sliding contact 28 on the armature current feedback potentiometer 24 will be well below that of the sliding contact 47 on the field current feedback potentiometer 46 and the motor will have been operating according to a preset normal condition on a weak field during the last stages of an acceleration period.

Describing the operation of this embodiment in more general terms, it may be said that during normal operation the feedback signal from the load detector is less than the feedback signal from the flux detector, and that a normal proportion exists between the two feedback signals when the armature current feedback signal is equal to or less than the field current feedback signal. When the load on the motor 4 increases to the point where the armature is slowed and field strengthening is required to produce the necessary torque, the feedback signal from the load detector and the flux detectors will deviate from the norm and the load detector feedback signal will exceed the feedback signal from the flux detector resulting in the transmission of an error signal proportional to the deviation from the error detector 29 to the controllable field excitation source 3 to strengthen the field proportional to the deviation of the feedback signals from the norm.

Turning now to the second embodiment diagrammed in FIG. 2, it will be seen that while some aspects of the embodiment vary substantially from the first embodiment other components remain identical and for the latter components the same reference numerals will be used as appear in the first embodiment. As in the first embodiment, the alternating current power lines 1 supply the power for converters which drive the direct current motor 4. Power transformers 55 and 56 have their primary windings 57 and 58 connected across the power lines 1 and their secondary windings 59 and 60, respectively, connected to the plates 61 and 62, 63 and 64 of the corresponding thyratrons 65, 66 and 67, 68. Cathodes 69 and 70, 71 and 72 of the thyratrons 65, 66, 67 and 68, respectively, are connected in common to the armature 5 of the motor 4 through the armature circuit 6. The other side of the armature 5 is connected to center taps 73 and 74 on the secondaries 59 and 60 of the power transformers 55 and 56.

The thyratrons 65 and 66 have grids 75 and 76 connected to a firing circuit 77 which generates the firing signal for igniting the thyratrons 65 and 66. Similarly, the thyratrons 67 and 68 have grids 78 and 79 connected to a firing circuit 80. The firing circuits 77 and 80 are connected in common to receive a control signal from an armature speed control 81 which is connected to the armature 5. The speed control 81 is connected to receive the feedback signal from the armature 5 and to generate appropriate signals to the firing circuits 77 and 80 so as to maintain a predetermined motor speed through armature control. The feedback signal to the speed control 81 may come from a variety of well known devices, such as a small generator mechanically coupled to the armature 5, such as a tachometer, or an armature voltage feedback circuit which measures a counter E.M.F. generated in the armature.

A power transformer 82, providing energy for the field 7 of the motor 4, has its primary winding 83 connected in parallel with the power transformer 55 and 56 across the A.C. line 1 and its secondary 84 is connected to the plates 85, 86 of thyratrons 87 and 88, respectively. Grids 89 and 90 of the thyratrons 87 and 88 are connected to a thyratron firing unit 91 and cathodes 92 and 93 of the thyratrons 87 and 88 are connected in common through the field circuit 8 to one side of the field winding 6. The other side of the field winding 7 is connected to a center tap 94 and the secondary 84 of the power transformer 82.

As in the first embodiment described above, the load detector consists of an armature current sensor in the form of a direct current transformer 9, and a feedback signal source connected across the output of the current sensing device. However, in the present embodiment the positive output terminal 22 of the load detector rectifier 21 is connected to a common base line 95, and the negative output terminal 25 of the rectifier 21 is connected to one end of a voltage divider network, making up the feedback signal source in this embodiment, which consists of two divider resistors 96 and 97, the other end of which is connected to the common base line 95. A voltage tap 98 between the two divider resistors 96 and 97 is connected to an error detector 99, which in this case is the control winding of a magnetic amplifier which triggers the thyraton firing unit 91 for the thyratrons 87 and 88 in the controllable field excitation source made up of the thyratrons 87 and 88.

Similarly, the flux detector in the second embodiment also consists of a field current detector in the form of the direct current transformer 31 which has the control winding 36 of saturable reactor 32 connected in the field circuit in series with the field winding 7, and its main winding 37 in series with the secondary 38 of an input transformer 33 and the primary 39 of the output transformer 31, the latter having its secondary winding 41 connected across the input terminals 42 of the bridge rectifier 34. Once again, in the present embodiment, as distinguished from the first embodiment, positive output terminal 43 of the bridge rectifier 34 is connected to the common base line 95 and a negative output terminal 44 of the bridge rectifier 34 is connected to one end of a feedback signal voltage divider network, the other end of which is connected to the common base line 95. The voltage divider network comprising the field current feedback source consists of two divider resistors 100 and 101 with a voltage tap 102 connecting the error detector 99 to a point between the two divider resistors 100 and 101. The error detector 99 has its output 103 connected to a thyratron firing unit 91.

There are two major distinctions between the first and the second embodiment. First, insofar as the field control is concerned the polarities are reversed in the second embodiment as compared with the first. In the second embodiment, the positive output terminals 22 and 23 of the rectifiers 21 and 34, respectively, are connected to the common base line 95, whereas in the first embodiment the negative terminals 25 and 44 of the respective rectifiers 21 and 34 were connected to the common base line 26. This reversal of the polarities calls for appropriate adaptations in the remainder of the circuit, for in this embodiment the normal proportion between the feedback signals exists when the load detector feedback signal is equal to or of a higher potential level than the flux detector feedback signal. The second major distinction between the two embodiments is the absence in the second embodiment of a field limiting source with its drop resistor network. The purpose of the limiting source 50 is to prevent excessive current flow in the field 7 beyond its rated maximum. The need for such a limiting source may be critical in many applications of the invention, but in others where the parameters of the control circuit and the ratings of the motor are such that there is little or no chance of drawing excessive field current, the limiting source may be omitted, as it is in the second embodiment shown here.

During normal operation of the second embodiment shown in FIG. 2, the voltage tap on the load detector divider network 96–97 is at a higher potential than the voltage tap 92 on the flux detector divider network 100–101, effectively back biasing the blocking diode 104. However, when an overload condition develops causing the armature current to increase, the signal across the output terminals 22 and 25 of the load detector rectifier 21 increases proportionately driving the negative output terminal 25 to lower or more negative potential. When the voltage tap 98 on the load detector output becomes more negative than the voltage tap 102 on the flux detector output, the blocking diode 104 is forward biased and permits current to flow from the voltage tap 102 on the flux detector output toward the load detector output. This generates an error signal through the control winding of the magnetic amplifier of the error detector 99 causing a greater output of current on the thyratrons 87, 88 through the field circuit 8 to the field winding 7. As in the previous embodiment, this increased field current is reflected in the error signal maintaining the proper proportion between the field strength and armature current.

Figure 3:
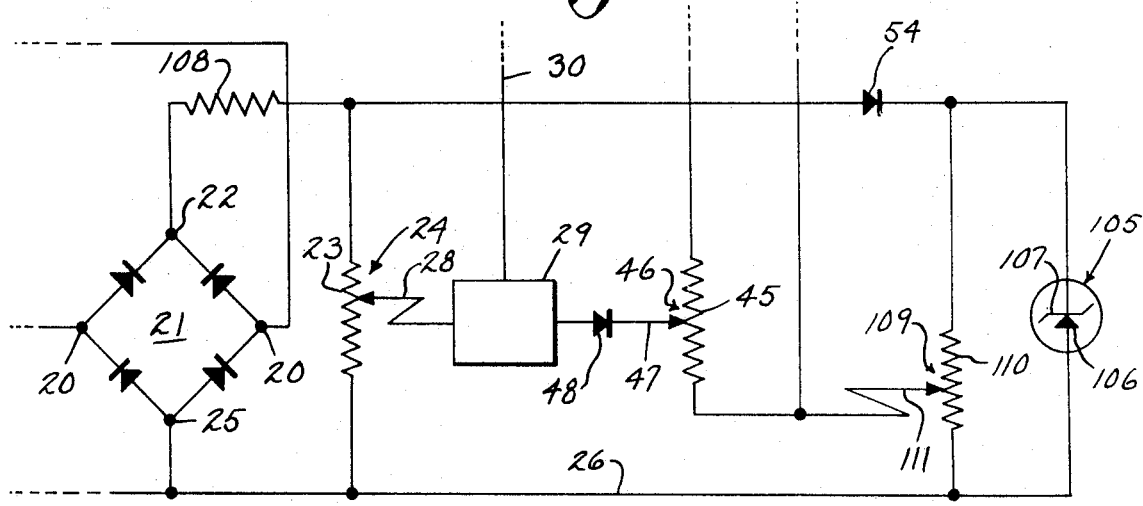
FIG. 3 is a schematic diagram of a third embodiment of the present invention.

FIG. 3 is a schematic circuit diagram illustrating the essential part of a third embodiment of the present invention. The remainder of the circuit making up the third embodiment, but not shown in FIG. 3, appears in FIG. 1. Accordingly, components common to both FIG. 1 and FIG. 3 are given the same reference numerals so that the circuitry of FIG. 3 can readily be substituted for the corresponding circuitry in FIG. 1 to incorporate it into a closed loop motor control circuit such as that shown in FIG. 1. Hence, the bridge rectifier 21 in FIG. 3 provides across its output terminals 22 and 25 the output of an armature current sensing device, corresponding to the D-C transformer 9 in FIG. 1. Similarly, the field current feedback potentiometer 46 in FIG. 3 is connected across a field current sensing device such as the D-C transformer 31 in FIG. 1. Finally, the error detector 29 has its output 30 in FIG. 3 connected to a variable, controllable field excitation source, such as the field excitation source 3 in FIG. 1.

A Zener diode 105 is connected across the output terminals 22 and 25 of the bridge rectifier 21 of the armature current sensing device, with its anode 106 connected in common with the negative output terminal 25 through the base line 26. The positive output terminal 22 of the bridge rectifier 21 is connected to an anode 107 of the Zener diode 105 through a drop resistor 108 and the blocking diode 54, which is connected cathode-to-cathode with the Zener diode 105. A clamping potentiometer 109 has its resistance element 110 connected across the Zener diode 105, between the cathodes of the Zener diode 105 and the blocking diode 54, and its sliding tap 111 is connected to one end of the resistance element 45 of the field current feedback potentiometer 46. The other circuitry shown in FIG. 3 has been described in connection with the first embodiment shown in FIG. 1.

The operation of the third embodiment differs in some respects from the operation of the first and second embodiment. First, the third embodiment shares with the first embodiment the clamping feature that is absent in the second embodiment, but the third embodiment achieves clamping with Zener diode 105 instead of the D-C source 50 used in the first embodiment. To begin with, assume weak field operation with heavy loading of the motor resulting in increasing armature current. As armature current increases, the potential level of the positive output terminal 22 of the armature current sensing bridge rectifier 21 also increases, and current flows from the positive output terminal 22 through the drop resistor 108 and through the parallel connected resistance elements 20 and 110 of the armature current feedback potentiometer 24 and the clamping potentiometer 109, respectively.

Under the conditions described, the relative settings of the sliders 28, 47 and 109 on the armature current feedback potentiometer 24 and the field current feedback potentiometer 109, and the clamping potentiometer 109, respectively, result in a potential difference between the armature feedback slider 28 and the field feedback slider 47 such that the error detector 29 will emit an error signal to strengthen the field. Although the proportionate potential levels of the armature feedback slider 28 and the field feedback slider 47 remain constant, the absolute potential difference between them increases as the potential level of the positive output terminal 22 of the armature detector rectifier 21 increases, and thus the error signal may also increase.

However, the increase in the potential levels of the armature feedback slider 28 and the field feedback slider 47 are limited or clamped at a predetermined maximum level by the operation of the clamping Zener diode. When the potential level of the positive output terminal 22 on the armature current sensing rectifier 21 reaches a certain point, the potential drop imposed across the clamping Zener diode 105 reaches the breakover value for the Zener diode 105, which then begins to conduct, shunting the output of rectifier 21. All further increases in the output of the rectifier 21 are dissipated across the drop resistor 108, and the potential difference between the armature feedback slider 28 and the field feedback slider 47 are clamped at that constant, maximum value.

As the armature current subsides and the potential level of the positive output terminal 22 decreases, the clamping Zener diode 105 reverts to its non-conductive state when the potential across it is sufficiently reduced. After the Zener 105 ceases conducting, further decreases in the potential level of the output terminal 22 reduce the error signal from the error detector 29 and thus causes the field to be weakened. This will continue until the predetermined mode of motor operation is reached, when no error signal is generated.

Th foregoing discussion has ignored the effect of the changing field strength, which will be reflected in the potential level of the slider 47 on the field current feedback potentiometer 45. Thus as the armature current increases, the field will be strenghtened, with the resulting condition in which the armature current increase raises the level of the armature feedback signal on the slider 28 while the field strengthening raising the level of the field current feedback signal on the slider 47. Although the error signal tends to be increased by the rising armature feedback signal, the error signal simultaneously tends to be decreased by the rising field current feedback signal. The reverse action, when armature current is decreasing, likewise tends to minimize the error signal. To summarize, the present invention in the third, as well as the other embodiments provides a continuous closed loop feedback control system for effecting secondary control of the torque and speed of a shunt field D-C motor.

Figure 4:
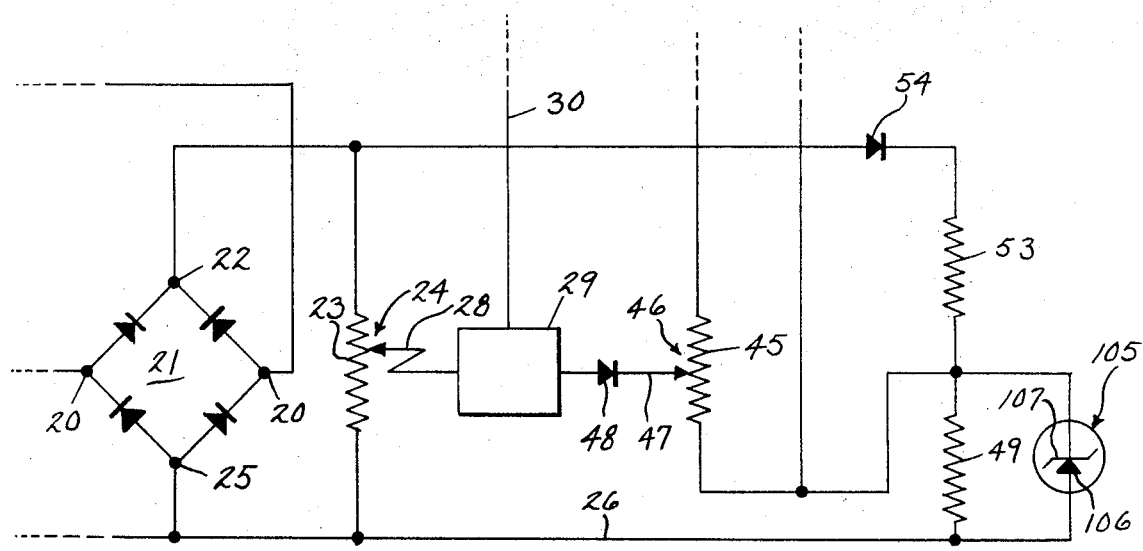
FIG. 4 is a schematic diagram of a fourth embodiment of the present invention.

The fourth embodiment illustrated in FIG. 4 is a variation of the third embodiment. In the fourth embodiment, the clamping Zener diode 105 is connected only across the resistor 49 of the voltage divider network. The function of the drop resistor 108 in the third embodiment may be performed by the other resistor 53 in the voltage divider network, so the drop resistor 108 does not appear in the fourth embodiment. The operation is otherwise the same as the described operation of the third embodiment. Since the resistor 53 in the fourth embodiment must perform the function of resistor 108 in the third embodiment, the size of the resistor 53 in the fourth embodiment is confined, and this in turn determines the size of the series resistor 49 in the voltage divider network. Thus the fourth embodiment lacks the flexibility of the third embodiment, but the fourth embodiment would also be less expensive than the third.

To summarize, all four embodiments generate a load feedback signal proportional to the load on the motor by sensing the armature current and producing a proportional signal; all four generate a flux feedback signal by sensing the current flowing in the field and producing a proportional signal; and all four compare the load and flux feedback signals in an error detector which generates an error signal reflecting the magnitude of any difference in the feedback signals. The error signal is used by all four to control the strength of the field so as to maintain optimum field strength for any motor speed. All four embodiments represent continuous closed loop feedback control systems each of which seeks an equilibrium at a predetermined mode of motor operation through secondary, or field regulation. The first, third and fourth embodiments contain means for limiting the maximum field strength attainable for applications where such a safety device is desirable. The second embodiment applies the invention to a situation where field limiting is not necessary and can therefore be eliminated.

Through the description of the embodiments shown, the capability of the present invention to provide optimum field strength at all times is demonstrated. Particular stress is laid upon the situation where a stall occurs from an overload and there is insufficient torque due to the normal weak field to accelerate the motor back to normal operating speed. It is abundantly apparent, however, that the present invention will automatically restore field strength in any other time of need, such as during starting, and then automatically, gradually and steplessly cause the motor to revert to the preset weak field operation as soon as the motor is sufficiently accelerated. Moreover, the variation in field strength will always be proportional to the precise needs of the motor under any given circumstances. Where necessary, protection against excessive field current may be built into the control. While these advantages are manifested in the embodiments shown, their manifestation depends not on the specific components and structures of those embodiments, but rather the presence of the advantage follows from the participation of those embodiments in the essence of the present invention which is set forth in the following claims.

We claim:

1. A control for the main field of a direct current motor comprising the combination of:

a load detector for connection to an armature of a D-C motor to sense magnitude of a load on said motor and to provide a first feedback signal proportional to said magnitude of said load, said load detector including an armature current sensing device connected to an armature circuit of said motor to sense armature current through said motor and to provide said feedback signal proportional to said armature current, and said armature current sensing device includes a direct current transformer having a saturable reactor with a control winding connected in series with said armature, main winding connected in series with an alternating current source, an output transformer with a primary winding connected in series with an alternating current source and said main winding and a secondary winding, and a rectifier having output terminals and input terminals with said input terminals connected across said secondary winding of said output transformer, and a potentiometer connected across said output terminals of said rectifier;

a flux detector connected to sense flux generated by a main field of said motor and adapted to provide a second feedback signal proportional to said main field flux of said motor;

an error detector connected to receive and compare said first and second feedback signals and adapted to provide an error signal proportional to a deviation from a preset norm in proportionality between said first and second feedback signals;

and a controllable field excitation source for exciting said main field of said motor and being connected to receive said error signal from said error detector and adapted to vary excitation current to said main field so as to restore said proportionality of said feedback signals to said preset norm.

2. A control for the main field of a direct current motor comprising the combination of:

a load detector for connection to an armature of a D-C motor to sense magnitude of a load on said motor and to provide a first feedback signal proportional to said magnitude of said load;

a flux detector connected to sense flux generated by a main field of said motor and adapted to provide a second feedback signal proportional to said main field flux of said motor, said flux detector including a field current detecting device connected to detect the magnitude of said excitation current in said field and adapted to provide said second feedback signal proportional to said magnitude of said excitation current through said field, and said field current detecting device including a direct current transformer having a saturable reactor with a control winding connected in series with said main field of said motor and a main winding, an alternating current source connected in series with said main winding, and output transformer having a primary connected in series with said main winding and said alternating current source and a secondary, a rectifier having input terminals connected across said secondary and output terminals, and an output potentiometer connected across said output terminals of said rectifier;

an error detector conected to receive and compare said first and second feedback signals and adapted to provide an error signal proportional to a deviation from a preset norm in proportionality between said first and second feedback signals;

and a controllable field excitation source for exciting said main field of said motor and being connected to receive said error signal from said error detector and adapted to vary excitation current to said main field so as to restore said proportionality of said feedback signals to said preset norm.

3. A speed control for a direct current motor comprising the combination of:

a direct current motor having an armature connected across an armature power supply and a field;

a controllable field excitation source for providing excitation current for said field of said D-C motor;

an armature current detecting device connected to said armature of said motor for detecting the magnitude of armature current from said armature power supply though said armature and for providing a first feedback signal proportional to said magnitude of said armature current;

a flux detecting device connected to sense a magnitude of excitation current flowing from said controllable field excitation source through said main field of said D-C motor and adapted to provide a second feedback signal proportional to said magnitude of said field excitation current;

an error detector connectted to receive said first and second feedback signals and adapted to compare said feedback signals and to emit an error signal to said controllable excitation source propotrional to a deviation from a preset norm of proportionality between said feedback signals to control the magnitude of said excitation current to said main field;

a field current limiting device connected to said load detector of said flux detector to effect a maximum limit on the absolute value of said feedback signal, said armature current detecting device having an output potentiometer and emitting said first feedback signal from a sliding contact on said output potentiometer;

said flux detector having an output potentiometer and emitting said second feedback signal from a sliding contact on said output potentiometer;

and said field current limiting means including a D-C source connected across said potentiometer of said armature current detecting device, a voltage divider connected in parallel with said D-C source and said potentiometer of said armature current detecting device, and a normally back biased diode connected in series between said potentiometer of said armature current detecting device and said voltage divider, said output potentiometer of said flux detecting device being connected to said voltage divider.

4. A speed control for a direct current motor comprising the combination of:

a direct current motor having an armature connected across an armature power supply and a field;

a controllable field excitation source for providing excitation current for said field of said D-C motor;

an armature current detecting device conected to said armature of said motor for detecting the magnitude of armature current from said armature power supply through said armature and for providing a first feedback signal propotrional to said magnitude of said armature current;

a flux detecting device connected to sense a magnitude of excitation current flowing from said controllable field excitation source through said main field of said D-C motor and adapted to provide a second feedback signal proportional to said magnitude of said field excitation current;

an error detector connected to receive said first and second feedback signals and adapted to compare said feedback signals and to emit an error signal to said controllable excitation source proportional to a deviation from a preset norm of proportionality between said feedback signals to control the magnitude of said excitation current to said main field;

a field current limiting device connected to said load detector and said flux detector to effect a maximum limit on the absolute value of said feedback signals;

said armature current detecting means including a potentiometer and emitting said first feedback signal on a sliding contact of said potentiometer;

said flux dtetcting means including a potentiometer with a sliding contact and emitting said second feedback signal on said sliding contact;

a Zener diode being connected in parallel with said potentiometer and said armature current detecting device;

and a voltage divider being connected in parallel with said Zener diode and said potentiometer in said armature current connecting device, and said potentiometer in said flux detecting device being connected to said voltage divider.

References Cited

UNITED STATES PATENTS

| | | | |
|---|---|---|---|
| 2,870,390 | 1/1959 | Ludwig | 318—356 X |
| 3,263,147 | 7/1966 | Robinett | 318—523 X |
| 3,297,930 | 1/1967 | Payne | 318—338 X |

ORIS L. RADER, Primarl Examiner

R. J. HICKEY, Assistant Examiner

U.S. Cl. X.R.

318—332, 350